(12) United States Patent
Levine

(10) Patent No.: US 7,030,092 B1
(45) Date of Patent: Apr. 18, 2006

(54) ULTRA-HIGH FIBER SUPPLEMENT AND METHOD OF REDUCING WEIGHT CARDIOVASCULAR RISKS AND INGESTED TOXINS.

(75) Inventor: Scott Levine, Orlando, FL (US)

(73) Assignee: Small Giant L.L.C., Orlando, FL (US)

( * ) Notice: Subject to any disclaimer, the term of this patent is extended or adjusted under 35 U.S.C. 154(b) by 306 days.

(21) Appl. No.: 09/939,385

(22) Filed: Aug. 24, 2001

(51) Int. Cl.
*A01N 43/04* (2006.01)
*A61K 31/70* (2006.01)
*A23L 2/00* (2006.01)

(52) U.S. Cl. .......................... 514/23; 514/25; 426/72; 426/74; 426/590; 426/615; 426/658

(58) Field of Classification Search .................. 514/23, 514/25; 426/49, 72, 74, 443, 658, 615, 590, 426/597, 599
See application file for complete search history.

(56) References Cited

U.S. PATENT DOCUMENTS

| 4,784,861 A | * | 11/1988 | Gori |
| 4,824,672 A | * | 4/1989 | Day et al. |
| 4,877,627 A | * | 10/1989 | Leitz et al. |
| 5,026,689 A | * | 6/1991 | Ringe et al. |
| 5,219,570 A | | 6/1993 | Barbera |
| 5,545,414 A | | 8/1996 | Behr |
| 5,976,603 A | | 11/1999 | Kota |
| 6,004,610 A | | 12/1999 | Wang |

* cited by examiner

*Primary Examiner*—James O. Wilson
*Assistant Examiner*—Traviss C. McIntosh, III

(57) ABSTRACT

An improved ultra-high fiber supplement that promotes satiety, caloric reduction, and weight loss. The supplement comprises guar, oat, psyllium, locust bean gum, pectin, green tea, multi-anthocyanadins, pyridoxine, and folic acid. It improves cardiovascular health and reduces cardiovascular inflammation and the risk of heart disease. The addition of antioxidants, including green tea, improves weight loss, and general and cardiovascular health. Also it reduces serum lipoprotein oxidation and risk of free-radical related diseases. Additional benefits include the lowering of plasma homocysteine by the addition of folic acid and pyridoxine. Consumption of the supplement aids in reducing absorption and assimilation of ingested toxins. A method of providing an ultra-high fiber comestible that is highly palatable and can be used to supplement nutrition and to manage and prevent diet-related diseases is disclosed. Further embodiments increase fiber and other nutrients in the diet and helps manage and prevent all diet-related diseases.

29 Claims, No Drawings

ULTRA-HIGH FIBER SUPPLEMENT AND METHOD OF REDUCING WEIGHT CARDIOVASCULAR RISKS AND INGESTED TOXINS.

FEDERALLY SPONSORED RESEARCH

Not Applicable

SEQUENCE LISTING OR PROGRAM

Not Applicable

BACKGROUND OF THE INVENTION

1. Field of Invention

The present application generally relates to nutrition, in particular an ultra-high fiber supplement, the making of the supplement, and its use in weight loss, promoting health, and minimizing disease.

2. Discussion of the Prior Art

Many medical conditions are partially or fully related to the diet consumed. Individuals living in industrialized countries suffer from a diet that is too high in fats, cholesterol, salt, and sugars, and grossly deficient in complex carbohydrates and fiber. Most foods consumed are highly refined and stripped of fiber and nutrients. To make them appealing and commercially successful these foods are then enhanced with fat and sugars. Such foods are a multi-billion dollar industry, which is rapidly growing. Snack foods are notorious for being rich in salt, fat, cholesterol, and calories. The explosion in snack foods available over the past 15 years closely mirrors the increased incidence of obesity that has become alarmingly prevalent. The National Cancer Institute estimates that at least 30% of cancers are diet related. The explosion of diabetes is related to a diet too rich in calories and simple sugars. Coronary artery disease accounts for 50% of deaths and is strongly related to cholesterol, saturated fats, and obesity. Another common disease tied to obesity is sleep apnea, a breathing disorder that occurs while sleeping, is responsible for cognitive dysfunction, a variety of medical ailments and even death.

Even so called low-fat or "light" snacks have their problems. Many "light" snacks are not really low in fat but meet the criteria to be called "light" or low fat because they contain one-third fewer calories or half the fat of a non-light or reference food. Hence, a food item that may contain 20 grams of fat is considered "light" if the reference food contained 40 grams of fat. Low-fat foods by definition can contain up to three grams of fat per serving. The public is further harmed by the fact that serving sizes are not standard and confusing. A low-fat cookie containing 3 grams of fat becomes a substantial source of fat when two or more are consumed. Unfortunately many of these seemingly healthy products are not healthy since they contain hydrogenated fats, cholesterol, saturated fats, and trans fats—all considered harmful. The beverages consumed by both children and adults have contributed to the obesity of the population. Most of these drinks are high in sugar (sucrose or high-fructose corn syrup).

The public is inundated by ads claiming to offer health benefits for various products. In reality, many of these products offer little or no help and may even be detrimental to health. Many health fads have come and gone. The Federal Drug Administration has little control over the exploding nutritional supplement market that permits companies to make unsubstantiated claims, and launch new products that have no proven value. The growing market for nutritional supplements and the lack of tight state or federal regulation serves only to confuse the consumer.

Obesity is rising at epidemic proportions for both children and adults. Marketers seeking to profit from this market have introduced a variety of weight-loss products that are ineffective. These include so-called fat blockers, starch blockers, magnetic diet pills, diet patches, spirulina (blue-green algae), weight-loss earrings, appetite-suppressing eyeglasses, a variety of herbal products, electrical stimulators, etc.

Many diet products on the market are outright dangerous. Thermogenic products—touted to speed metabolism—contain actual stimulants that can be harmful or deadly. Many diet products contain such stimulants as ephedra, ma huang, and kola nut; these are names the public does not readily equate with stimulants. Over-the-counter diet pills, while being commercially successful, have not produced sustained weight loss. Most doctors consider these products to be ineffective and potentially dangerous.

Prescription medications for weight loss have had limited success as well. People have taken prescription stimulants and thyroid medications. These can only be used temporarily and have numerous side effects (hypertension, insomnia, palpitations, dizziness etc.). A new product, sold under the trademark Xenical by, Hoffmann-La Roche Inc. Nutley, N.J., attempts to minimize fat absorption in the gut. It has not turned out to be the panacea we had hoped for. It must be consumed three times per day and has side effects of diarrhea, abdominal pain, fecal incontinence, and vomiting. It can also cause a deficiency in fat-soluble vitamins. Despite taking this medication three times daily for a year, and partaking in a reduced-calorie diet, the weight loss in a test group was on average only 13.4 lbs at the end of one year—just greater than a pound per month.

Various commercial weight-loss centers exist. They use various methods to help weight reduction. Some offer pre-packaged meals that reduce choice, and can be costly. Others are overly cumbersome, requiring food items to be weighed or converted into a number of calories or points that are then restricted on a daily basis. Some of these programs have group counseling which may be inconvenient or embarrassing.

Several weight-loss drinks are commercially available. Typically, they consist of low-calorie meal replacements. Some are premixed and ready to drink. Some are dry powder mixes that are reconstituted in liquid to form a sweet-tasting, fruit-flavored liquid. These drinks have allowed some to lose weight, but they have had little success in getting most people to reduce their weight down to the ideal body weight and maintain it. Furthermore, most users abandon the program and regain their weight.

There are several problems with these drinks. In order to make the drink taste good they have added fat, salt, sugar, and even undesirable sweeteners. Many of these meal replacement drinks do not taste well, are not satiating, and commonly people become bored with drinking the same flavor or group of flavors daily. Eventually, the person drops the drink program and gains their weight back.

Some of the drinks do not contain any fiber. Typically the drinks contain 3 grams of fiber or less. Many of contain undesirable ingredients, such as fat, saturated fat, and sugars. These fats and sugars are a source of unwanted calories. Many contain potentially harmful vitamins and nutrients that are not be recommended by medical doctors, such as iodine, iron, chromium picolinate, etc. These drinks typically contain significant protein, which may be harmful to anyone who has some kidney insufficiency. (This is especially so, if they are getting other sources of protein in their diet e.g., from meat and dairy products). People have even gained weight on these drinks. Commonly the drink is not fully-satiating, so the individual may eat a meal or snack food in addition to the drink, thereby actually increasing their normal caloric consumption.

Some of the products used as meal replacements can cause drastic weight loss. This is unhealthy as it removes muscle in addition to fat. This drastic weight loss can cause many medical problems, including syncope, fatigue, hypotension, gallstones, dehydration, constipation, blood electrolyte imbalances, heart irregularities, and even death. Some of the more professional products require a physical exam prior to initiating the program and continuous health evaluations while on the weight loss program. Continuous doctor and laboratory monitoring can be both inconvenient and expensive.

The end result of these weight-loss drinks is that they generally do not taste well, are not satiating, contain potentially harmful ingredients, are difficult to stay on long term, and ultimately result in rather minor unsustained weight loss. It is well known that 80% of people who diet regain the weight within a short period of time. Most of these people will continue to gain weight during their lifetime.

There is no good weight-loss method that works for the majority of the population, despite the fact there is such a variety of dietary programs and aids. For the same reason, most dieters have tried several different methods of dieting. Even though some dieters have had some success, they frequently hit a plateau and cannot lose more weight. Eventually, they abandon the weight-loss product and go back to eating as they have always done. Dieters may experience an initial weight loss and then typically regain even more weight than they lost. This common phenomenon, known as yo—yo dieting, is unhealthy and harmful. Recent studies suggest that yo—yo dieting may be more harmful than remaining consistently overweight.

Regarding the low fiber content of the drinks, fiber is the indigestible complex carbohydrates found in plants. It has no calories as the body does not have a way to absorb it. Based on their physical characteristics, fibers can be divided into two groups, water-soluble and water insoluble. Soluble fibers include gum, pectin, various fruits, vegetables, seeds, barley, rye, oat bran, dried beans, and psyllium seed. Insoluble fibers include certain fruits and vegetables, rice, whole grains, cereals and pasta, cellulose, hemicelluloses, lingnins, and psyllium husk. Many fruits and vegetables contain both soluble and insoluble fiber.

Medical and nutritional studies show that fiber is essential to good health. Research shows that it can help prevent cardiovascular disease, diabetes, obesity, gastrointestinal diseases, hypertension, osteoporosis, and several types of cancer. Insoluble fiber has been shown to provide good health to the gastrointestinal tract by providing numerous benefits, including preventing overeating by its absorption of water and slowing gastric emptying. Fiber stretches the stomach, which sends nerve impulses to the brain's satiety center. Insoluble fiber also modifies fat absorption, increases bile acid secretion, absorbs cholesterol and reduces endogenous cholesterol production, and promotes peristalsis to decreases transit time of waste out of the body.

Fiber has been shown to have another important benefit. It detoxifies and speeds the removal of toxic substances. Fiber offers these benefits through several mechanisms. The fibers prevent absorption of some toxins and carcinogens by binding to them in the stomach and small intestine and then speeding them trough the gastrointestinal tract until they are excreted. Bile acids, cholesterol, and toxic heavy metals all stick to the fibers and are excreted in the same fashion.

Other advantages of fiber include a delay in stomach emptying, while stimulating motility of the large intestine. This creates satiety, yet speeds waste products and toxins out of the body. Fiber increases the bulk of the stool and absorbs water, helping to soften the stool and ease evacuation.

The average intake of dietary fiber in the United States is between 10–15 grams per day. Medical researchers and regulatory agencies recommend between 25–40 grams of fiber per day. Increasing the consumption of complex carbohydrates in the form of fiber is thus practically a necessity. Recommendations even run higher for larger people. Current recommendations call for an increase in fruits and vegetables, as well as whole grain breads and cereals to make up this deficit. To obtain an increase of 10–30 grams of fiber a day means eating a lot more of these food items, which could be inconvenient, costly, and could provide a significant source of sugar, fats, calories, and undesirable ingredients to the diet as well.

The US Food and labeling laws allow a manufacturer to call their product "high" fiber if the product contains 20% or more of the recommended Daily Value (DV). In the case of fiber, a product containing as little as 4 grams of fiber per serving can legally be called "high fiber". The same laws allow a manufacturer to state a product is a "good source" of fiber if it contains 10–19% of the recommended daily value. These terms only serve to confuse the consumer and mislead many to think they are replacing their fiber deficit by having one serving of a product that has a "good source or high fiber" designation.

Beverage products are a convenient way to deliver this fiber. The problem with creating a high-fiber beverage is the fiber itself. Fiber, by its very nature, does not dissolve or mix well in liquids. Fiber tends to clump and form lumps in fluid, or in the case of gums, quickly forms a thick viscous liquid or gel. This increase in viscosity and gelling takes place immediately and is directly proportional to the concentration and/or number of fibers added. In addition to these problems, fiber does not feel good to the tongue and mouth and frequently has a bitter or terrible taste. These organoleptic and unpalatable properties of fiber have made it difficult for people to increase their fiber consumption through the form of a beverage.

Numerous weight-loss beverages exist. Some contain fiber; others do not. The drinks that do contain fiber contain less than 7 grams of fiber per serving, and are not fully-satiating. To address this problem manufacturers attempt to promote satiety through the addition of carbohydrates, fats, and protein to the drink. As a result, these beverages become a source of additional calories and potentially dangerous sugars and fats. Sugars and fats are considered unhealthy to add to the diet as they are damaging to the vascular inner lining and they lead to heart disease, diabetes, obesity, and a variety of health conditions. Manufacturers have not figured out how to make a weight-loss beverage that is rich enough in fiber to be fully-satiating and at the same time palatable. Instead they rely on promoting satiety from the other caloric-rich ingredients or the combination of ingredients rather than the fiber alone. Some of these products, while technically meeting US Food and Labeling requirements to be called a "good source of fiber" or "high in fiber", actually contain rather meager amounts of fiber. These beverages do not even replace most individuals' fiber deficit when taken at the prescribed daily dose. The required frequent dosing of these products creates both compliance and convenience issues since most individuals have trouble adhering to the prescribed number of doses per day. This results in ineffective weight loss and frequently does not meet the governmental and medical recommendations of 25–40 grams of fiber per day.

These products also seek to create satiety through the addition of protein (whey, non-fat milk solids, casein, etc.) or the addition of fats or other caloric ingredients. One product sold under the trademark Ultra Slim-Fast is arguably the best selling and highest fiber over-the-counter weight-loss beverage. It comes in a variety of flavors and contains 10 grams of protein, 35+ grams of sugar, 2.5–3 grams of fat, and 5 mgs of cholesterol, in addition to the 5 grams of fiber per 325 cc serving. Of the total carbohydrate listed on the nutrition facts label, the weight of its sugars exceed the weight of its fiber grams by a ratio of 7 to 1.

The manufacturer of the Slim-Fast beverage has a website which recommends a "Slim-Fast plan" which consists "of 2 shakes or 2 Meal-On-The-Go-Bars a day, along with a sensible meal, as well as snacks." Slim-Fast powders contain only 2 grams of fiber per serving. (The Ultra Slim-Fast powders discussed above and Ultra Slim-Fast Ready-to-Drink Shakes contain more fiber—5 grams of fiber per serving, but this is still insufficient to replace most individuals' fiber deficit and would not cause satiety without the added fat and protein found in the drink). The Slim-Fast powders that are not premixed are supposed to be mixed with 8 fluid ounces of fat-free milk. Consuming two Ultra Slim-Fast beverages as directed, provides a total of only 10 grams of fiber per day. Two of their snack bars or Slim-Fast Shakes provides only 4 grams of fiber per day. Thus individuals following this plan can still remain deficient in fiber. The Slim-Fast snack bars come in a variety of flavors and in general contain 5 grams of fat, 23 grams of sugar, 8 grams of protein yet only 2 grams of fiber. The carbohydrates listed are in a ratio of 9 to 1, sugar to fiber.

Herbalife, located in Century City, Calif., is a successful network marketing company that has been in business over twenty years. They sell a high protein, low-carbohydrate program weight-management drink mix under the trademark HERBALIFE THERMOJETICS which comes in various flavors and contains 70–80 calories, 0.5 gram of fat, 15 grams of protein, and no fiber whatsoever. The HERBALIFE THERMOJETICS drink shake mix comes in chocolate and vanilla and contains 110 calories, 3–4 grams of fat, 15 grams of protein, and only 1 gram of dietary fiber. The nutrition facts panel listed on the Herbalife website does not list the recommended number of daily servings, but assuming even three shakes per day, the total fiber consumed would be only 3 grams.

Various products exist for both weight loss or bowel irregularity containing much less than 4 grams of fiber per serving. OPTIFAST, a trademark of (Novartis, Minneapolis, Minn.), is a doctor-supervised program in which individuals can consume either a powder mix, a ready to drink formula, or a soup under the OPTIFAST 800 trademark-all containing no fiber. MEDIFAST, a trademark of (Jason Pharmaceuticals, Inc. Baltimore, Md.), is another doctor-supervised weight loss program. The Medifast drink contains only 3 grams of fiber per serving. METAMUCIL drink (Procter & Gamble) also contains 3 grams of fiber per serving. CITRUCEL drink (Merrell Dow Pharmaceuticals Inc.) contains 2 grams of fiber per serving. FiberCon pills (Lederle Consumer Health, Madison, N.J.) contains only 1 gram of fiber per serving. BIOSLIFE2 drink (Unicity Network Orem, Utah) is a product advertised for weight management and for cholesterol lowering. It still contains only 4.5 grams of fiber per serving. Most of these products are taken once to three times daily. In many cases these "high" fiber products do not approach the 10–25 gram fiber deficit most Americans suffer. Consequently, users of these products do not obtain all the health advantages of higher fiber in the diet.

One reason most manufactures limit the fiber to 3 grams or less is the problem with gastrointestinal side effects. Typically the more the fiber consumed, the greater the chance that the fiber will cause bloating, abdominal pain, and diarrhea.

Manufacturers also have not produced a beverage containing 7 or more grams of fiber due to the problems in viscosity, clumping, and gelling. To get even 3 grams of fiber, manufacturers use low-viscosity fibers, or guar that has been hydrolyzed to decrease viscosity. Other ingredients (sugars, fats, proteins) are added then to assist in making the drink organoleptically pleasing.

Various prior-art publications have discussed a need to get around the obstacle of making a high fiber beverage that is organoleptically acceptable and drinkable by complicated processing. Kota, in U.S. Pat. No. 5,976,603, Nov. 2, 1999, describes how fiber can be combined with a carrier and flash-flowed processed into a shearfrom matrix to prevent clumping. Barbera, in U.S. Pat. No. 5,219,570, Jun. 15, 1993, teaches how psyllium husk can have improved mixablity and dispersability by dispersing an edible acid in an agglomerating coating. Wang, in U.S. Pat. No. 6,004,610, Dec. 12, 1999, teaches that hydrolyzed guar gum mixed with arabinogalactan creates a low-viscosity product that is suitable for drinking. Beher, in U.S. Pat. No. 5,545,414, Aug. 13, 1996, teaches that a nutritional bar with fiber (guar) encapsulated with zein gives improved mouth feel.

These prior-art approaches have significant limitations, complications, and expenses to the manufacturing of the product, yet still do provide less than 7 grams of fiber per serving.

OBJECTS AND ADVANTAGES

Accordingly several objects of the present invention are to provide an improved nutritional and weight-loss supplement. It provides a safe, easy, and effective method of weight loss that can lead to long-lasting weight reduction. It also provides ultra-high fiber (7 or more grams of fiber per serving), and an ultra-high fiber beverage that does not require special processing or chemical additives to prevent immediate gelling. It also provides a method of satiety using a powder mixed with fluid that is organoleptically pleasing to swallow, yet thickens and increases viscosity quickly to fill the stomach. It creates satiety so that when an individual eats a normal diet, they will eat less of it. It provides a method by which one can lose weight without qualitative food restrictions, helping to prevent yo—yo dieting. It provides satiety with little or no calories, long lasting satiety that extends beyond the meal hour, a diet additive which curbs snacking, a nutritional supplement that helps prevent assimilation of dietary fat, a dietary composition which may be adapted to limit the assimilation of different types of dietary fat, and which it can be taken conveniently before eating, a healthy form of weight reduction that is free of dangerous stimulants, which aids in the treatment and reduces the risk of developing these diet responsive diseases: cardiovascular, metabolic syndrome, homocysteinemia, elevated high sensitivity C-reactive protein (cardiovascular inflammation), diabetes, glucose intolerance, obesity, hypertension, cancer, osteoporosis, constipation, diverticulosis, hemorrhoids, irritable bowel syndrome, and sleep apnea. It prevents absorption and assimilation of ingested toxins and or carcinogens and speeds their transit trough the body.

Further objects and advantages are to provide a supplement which gives 7 and preferably 8.5 grams of fiber per 8–20 ounce serving and which can give 14 and preferably 17 grams in two servings.

Still further object and advantages are to provide an ultra-high fiber supplement that contains antioxidants, to enhance weight loss and prevent free radical damage to tissues, to provide protein, fats, and carbohydrates to supplement nutrition, to provide an energy drink or meal replacement, and to provide various herbs, botanicals, minerals, coenzymes, and vitamins to improve health.

SUMMARY

The present invention provides a method of making an ultra-high fiber beverage for use in weight loss, in promoting health, and in aiding in treatment and risk reduction of developing diet-related diseases.

An ultra-high fiber beverage powdered mix (7 or more grams of fiber per serving) can be made without special processing or chemical additives. The beverage has essentially zero calories and provides satiety without carbohydrates, proteins, or fat. The satiety is long acting, typically lasting for several hours. The beverage has a pleasing taste and good organoleptic properties. It can be mixed with a variety of liquids, including water which has no calories. The beverage promotes satiety and weight loss without food restrictions and limitations. Yo—Yo dieting is eliminated as food cravings are not denied, foods are not restricted, and the beverage powder can be mixed in various liquids providing an element of variety.

This ultra-high fiber supplement consists of three or more fibers, namely guar, oat, and psyllium. Each has specific physical properties and characteristics that, when mixed in specific proportions, provides a beverage with ultra-high fiber which has good organoleptic properties and consistency and does not immediately gel or clump. The fiber has zero calories and a beverage can be made that is rich enough in fiber that it can be fully satiating.

This ultra-high fiber beverage is used as a weight reduction diet and in the prevention and management of these diet responsive diseases: cardiovascular, metabolic syndrome, homocysteinemia, elevated high sensitivity C-reactive protein (cardiovascular inflammation), diabetes, glucose intolerance, obesity, hypertension, cancer, osteoporosis, constipation, diverticulosis, hemorrhoids, irritable bowel syndrome, and sleep apnea. It helps to prevent absorption and assimilation of ingested toxins and speeds their transit through the body.

DETAILED DESCRIPTION—BASIC BEVERAGE

An ultra-high fiber (7 grams or more per serving) content beverage can be made that is pleasant tasting and easy to drink. The fiber does not require special processing to make it dispersible, nor does it require any chemicals to enhance solubility. The ultra-fiber drink has superior satiating properties to products with less fiber. The unique blend of fibers, having specific properties and specifications, allows concentrating the fiber per serving, and making a pleasing-to-consume beverage that promotes rapid satiety.

In the preferred embodiment the supplement is an ultra-high (7 or more grams) of fiber powder made up of at least three types of fiber, preferably three or more types of fiber.

The serving size range is between 7–30 grams of fiber per serving. The preferred serving size is two scoops (approximately 30 cc each of the dry powder mix and containing 8.5 grams of fiber), for a total of 17 grams of fiber. One scoop (30 cc) is admixed with water or other liquid and drunk 60 minutes prior to meal and the second scoop (30 cc) is similarly admixed and drunk 30 minutes prior to meal.

The supplement is provided in the form of a dry beverage mix that comprises one or more sources of edible fiber. Edible fiber or fiber refers to any source of complex carbohydrate that can be ingested and processed without harm to humans. Fiber constitutes any plant, fungus, or yeast material that cannot be digested by the body. Fiber is usually referred to by its physical properties. Fibers that have high water-holding capacity are called soluble, whereas fibers with low ability to hold water are called insoluble. Each fiber has its own special properties and many sources of fiber product both soluble and insoluble fractions.

The supplement is made with at least three types of fiber. The fibers should be of the class from guar, oat, and psyllium fibers.

Guar is the fiber from (Cyamposis tetragonolobus (L.) Taub. (Fam. Leguminosae) and can come from any guar, either hydrolyzed, partially hydrolyzed, or nonhydrolyzed. Guar with physical properties demonstrating granulation between 50% through a US 200 mesh screen through 99% minimum through a US 300 mesh screen, a viscosity of 500–6000 cps in 1% aqueous solution when spun at 20 RPM with Brookfield RVT spindle #3, at a temperature of approximately 20–25° Celsius. The quantity of guar is between 0.5–15 grams and results in a 0.00086–0.63 solution (weight—weight) of the final constituted beverage.

Preferred guar is food grade, nonhydrolyzed with granulation of 65% minimum through a US 200 mesh screen, and a viscosity of 3800–4500 cps in 1% aqueous solution when spun at 20 RPM with Brookfield RVT spindle #3, at a temperature of 25° Celsius.

The preferred quantity is based on a two-scoop-per-serving regimen where each scoop contains approximately 30 cc of the dry beverage mix. Each 30 cc scoop contains 2.5–7 grams of guar and results in a 0.4–3% solution (weight—weight) at 25° Celsius.

The fiber from oats can come from any oat source providing a granulation of 1% through a 100 US standard mesh through 90% through a US standard 300 mesh, water absorption of 50%–1000% and a fat absorption of 50%–1000%. The quantity based on the two-scoop-per-serving regimen (each scoop contains 30 cc of dry beverage mix) is 0.1 gram–15 grams per serving and a 0.017–6.4% solution (weight—weight) at 25° Celsius.

The preferred oat fiber is an enhanced white oat fiber powder that has particle size reduction and improved maximum density. The granulation should be 90% through a US standard 200 mesh screen. Water absorption is 500–650%, and fat absorption is 250–400%. The preferred quantity based on the two-scoop-per serving regimen is 4–10 grams and 0.7–4.2% solution (weight—weight) at 25° Celsius.

The fiber from psyllium includes any psyllium seed or husk. The quantity is 0.1 gram to 8 grams per two-scoop-regimen (each scoop is 30 cc of dry beverage mix) creating a solution of 0.017–3.4% solution (weight—weight) at approximately 20–25° Celsius.

The preferred psyllium is psyllium husk that has a swell volume 30–50 milliliters per gram of psyllium. The preferred quantity of psyllium husk based on two-scoop-per-serving (each scoop containing 30 cc of dry beverage mix)

regimen is 0.5–4.0 grams creating a 0.086–1.7% solution (weight—weight) at 25° Celsius.

The dry beverage mix is made by blending the 7 grams of guar, 5 grams of oat, 2 grams of psyllium and at least one flavoring agent for each two-scoop-serving size. Each scoop contains approximately 30 cc of the dry beverage mix and 7 grams of fiber.

The preferred embodiment of the ultra-high fiber supplement is represented in the following Example.

EXAMPLE 1

An ultra-high fiber supplement made up of three fibers. This example is based on 2-scoops-per serving where each scoop contains about 30 cc of dry powder mix.

| Ingredient | grams per serving based on 2-scoop-per serving |
| --- | --- |
| Guar | 2–12 |
| Oat fiber | 1–15 |
| Psyllium husk | 0.5–10 |
| Flavoring Agent | 0.1–10 |

This supplement becomes a beverage by adding one scoop of approximately 30 cc of dry powder mix to approximately 8–20 ounces of water. The drink is then vigorously shaken for about 3–30 seconds in a cup with a lid. The drink is then consumed.

An alternative preferred embodiment is listed in Example 1A, discussed below.

Preferably, but optionally, the supplement is enhanced with one or more antioxidants. The addition of one or more antioxidants enhances the health benefits of the beverage. Antioxidants have been scientifically shown to help prevent and or assist in the treatment of cardiovascular disease, and a variety of cancers. Scientific evidence shows they can help prevent or ameliorate the effects of aging. Several antioxidants also have been scientifically proven to help detoxify and remove dangerous free radicals and toxins. These antioxidants can be from any source safe for human consumption including natural, synthetic, or any combination. Some examples of antioxidants include vitamins A, C, and E, enzymes such as catalases, glutathione peroxidase, superoxide disumutase, minerals such as selenium, and zinc, botanicals, herbs, and plant compounds such as anthocyanins, anthocyanidins, beta-carotene, bioflavonoids, catechins, carotenoids, curcuma, dandelion root, epicatechins, flavones, flavonoids, flavonols, garlic, ginkgo biloba, grape seed, grape skin, green tea, indoles, isocyanates, isoflavones, isoflavonoids, isoprenoids, lycopene, organosulfur compounds, phenols, phenolic acids, polyphenolic compounds, pycnogenols, resveratrol, silymarin, terpenes, tannins, thiols, and tocopherols (beta, gamma, and delta), and synthetic compounds such as alpha-lipoic acid, coenzyme Q10, and n-acetyl-l-cysteine.

In another preferred embodiment tea is optionally added to the dry beverage mix. While the beverage mix works without the addition of tea, I feel the plant components unique to tea enhances both the health benefits and the weight loss effects of the supplement. Any form of tea safe for human consumption may be used. Preferably green tea is used. This includes all types of green tea, whether caffeinated or decaffeinated and whether standardized or not standardized for the percentage of catechins. (Catechins are polyphenols that have antioxidant properties.) Numerous scientific articles confirm a variety of health benefits and the fact that green tea helps reduce weight. Green tea is rich in epigallocatechin-3-O-gallate (ECGC), a catechin that possesses special biological properties such as anti-cancer properties. Green tea is also rich in other health-enhancing plant compounds, such as flavanols, flavanol glycosides, polyphenolic acids, caffeine, amino acids, cellulose, lipids, mono- and polysaccharides, proteins, chlorophylls and volatiles. In preferred embodiment, 0.005–5 grams of green tea are added per serving.

In another embodiment, the supplement is enhanced with one or more vitamins or other health nutrients. This drink can be enhanced further to serve as a nutritional drink that provides the Daily Values of any or all vitamins and nutrients. Furthermore, this drink can be enhanced with doses of any or all vitamins and nutrients that partially meet, fully meet, or exceed the Daily Values to serve as a sports drink, nutritional supplement drink, or a drink for nutritionally impaired people. The vitamins and health nutrients include all vitamins and health nutrients from whatever source that are safe for human consumption, whether or not a Recommended Daily Allowance (RDA) or Daily Value has been established.

One preferred vitamin at this time is Folic Acid, vitamin B9. Folic Acid can be used in quantities of 0.1 microgram to 10 milligrams per serving. The preferred dosage is between 0.2 mg–5 mg per serving (two-scoop regimen). Another preferred vitamin is Pyridoxine, vitamin B6. Pyridoxine can be used in quantities of 0.1 mg–15 mgs per serving. The preferred dosage is between 1–5 mg per serving (two-scoop regimen). Folic Acid has been scientifically proven to limit neurologic birth defects and to reduce homocysteine, an amino acid that is damaging to the entire vascular system. Pyridoxine performs a number of essential functions in the body and is necessary for normal nervous system and cellular metabolism. Pyridoxine inhibits the formation of homocysteine. Homocysteine is a known cause of cardiovascular death. Folic Acid and Pyridoxine reduce the body's homocysteine level.

The dry beverage powder should preferably contain one or more sweeteners to enhance taste. The primary purpose of the sweetener is to provide the composition of the supplement with a palatable sweet taste and flavor. This includes all sweetening agents for human consumption, whether natural, artificial, synthetic or combination. The preferred sweetener is sucralose, sold under the trademark Splenda by McNeill Specialty Products Corporation, New Brunswick, N.J. 08903. Sucralose can be added in the range of 10 parts per million to 300 parts per million of final solution (powder and liquid). The preferred amount of sucralose is 50–130 parts per million (powder and liquid).

One or more flavoring agents can be added to enhance taste. The flavoring agent makes the beverage more palatable and promotes long-term compliance. All flavoring agents, whether natural, artificial, or a combination and of any forms such as solid, liquid, or powdered can still be used. The preferred flavoring agents are natural, artificial, and the combination of natural and artificial flavoring powders that can be added to the dry mix. The preferred flavors are any vanilla, cream, chocolate, strawberry, orange or any combination containing vanilla and or cream flavoring agents. The dosage range for flavoring agents is from 0.1–70% of the final solution (mix and liquid). The preferred dosage range is 2.5–15% of the final solution.

One or more other substances safe for human consumption can be added to aid in weight loss. These include natural, synthetic, or any combination of such substances. Some Examples include, L-carnitine, L-ornithine, L-tyrosine, L-tryptophan, L-phenylalanine, gamma-linolenic acid, chromium, glucose tolerance factor, vanadyl sulfate, Gymnema sylvestere, bromelain, pancreatin, papain, coenzyme Q10, curcumin, barberry, bearberry, Silymarin, Teucrium polium, choline, inositol, human growth hormone, DHEA (dehydroepiandosterone, caffeine, xanthines, kola nut, yerbamate, medium chain triglycerides, (−)-hydroxycitric Acid (HCA), kelp, lecithin, dihydroxyacetone, pyruvate, creatine, iodine, niacin, bladderwrack, and B vitamins.

An alternative preferred ultra-high fiber supplement that provides increased satiety and weight loss is demonstrated in Example 1A. This alternative preferred embodiment consists of the fiber from guar, oat, and psyllium with two additional fibers, locust bean gum and pectin. It is also enhanced with antioxidants (green tea and multi-anthocyanidins) and vitamins, (pyridoxine and folic acid). This particular combination of ingredients appears to aid in weight loss and in the prevention of cardiovascular disease. I believe this alternative preferred embodiment also lowers cholesterol and lipids better than the preferred embodiment listed in Example 1.

EXAMPLE 1A

Alternative Preferred Ultra-High Fiber Supplement

| Ingredient | grams per serving based on 2-scoop-per serving |
| --- | --- |
| Guar | 6–10 |
| Locust bean gum | 1.5–4 |
| Psyllium husk | 1–3 |
| Oat fiber | 5–7 |
| Pectin | .5–4 |
| Green Tea | 0.1–.4 |
| Multi-anthocyanidins | 0.05–.4 |
| Folic Acid | .0004–.0012 |
| Pyridoxine | .001–.010 |
| Splenda | 50–130 parts per million |
| Vanilla or Orange Flavor | 2–15% of final solution |

This supplement is blended as in Example 1. The supplement is mixed with 8–20 ounces of liquid and taken as previously described.

OPERATION OF THE ULTRA-HIGH FIBER SUPPLEMENT

The nutritional supplement is consumed orally and induces satiety and helps prevent and improves the management of diet-related diseases.

This supplement provides a method of weight loss. Obesity or any increased body mass is due to consumption of more calories than are needed. This supplement includes a simple regimen to induce satiety. An advantage of this supplement is that an individual does not need to change their diet, as caloric reduction will occur due to satiety. Eating a lower-fat, a lower-calorie, or any diet combination thereof will result in even quicker weight loss. It is also an advantage of this invention that daily exercise is not a requirement to lose weight. However participating in any aerobic exercise type program can help speed the weight loss. Obviously, both a lower-calorie and lower-fat diet along with daily aerobic exercise is an advantage to any weight loss program.

The supplement provides prevention and management of diet-responsive diseases including but not limited to: cardiovascular, metabolic syndrome, homocysteinemia, diabetes, glucose intolerance, obesity, hypertension, cancer, osteoporosis, constipation, diverticulosis, irritable bowel syndrome, hemorrhoids, and sleep apnea.

The ultra-fiber drink is taken prior to meals or as a snack substitute. The ultra-fiber comes as a powder that is mixed with water or beverage of choice, vigorously agitated, and then consumed. An additional dose can be taken if satiety has not fully been realized. Once satiety has been achieved (typically 5–60 minutes) the individual may attempt to eat a meal. The individual, having consumed the ultra-fiber drink, experiences a "full stomach" and will eat only a small portion of food. Caloric reduction occurs and the individual loses weight.

Fiber decreases satiety by several mechanisms. Fiber in the stomach hydrates, swells, and stretches nerve receptors in the stomach, sending signals to the brain that are interpreted as being satiated. The fibers further aid satiety by delaying emptying of the stomach contents. This also stretches nerve receptors in the stomach, and initiates release of hormones from the brain and gastrointestinal tract that increase satiety. Suppression of appetite also occurs through the bulking action of soluble fibers, which slow absorption of carbohydrates into the blood. This prevents a surge in blood sugar and limits the body's secretion of insulin during a meal. The body is protected from excessive insulin secretion that stimulates appetite and damages vessels, tissues, and organs.

I believe that weight-loss occurs with the fibers themselves; they can prevent absorption of some calories consumed. The fibers trap some fat, carbohydrates, and proteins-all forms of calories, preventing absorption and assimilation, and then speed these unabsorbed calories through the gastrointestinal tract. This results in calorie reduction and weight loss. Long-term success occurs because the process is simple and the individual does not have to refrain from foods they crave. Ultimately the goal of ideal body weight is achieved.

The ultra-fiber supplement has additional mechanisms of weight loss. One way weight reduction is promoted is through the action of green tea. Green tea is an antioxidant and a thermogenic agent. The actions of green tea have been scientifically studied and several mechanisms appear to cause weight reduction. While the caffeine in green tea is a known thermogenic agent, the effects on weight loss by green tea are much greater than would be expected from the caffeine content alone.

Both the catechins and caffeine in green tea are thermogenic (generate heat energy thru biochemical and nutritional means) and increase the basal metabolic rate (BMR). An increased BMR means more calories burned, less stored, and ultimately weight reduction. In addition, both the catechins and caffeine break down fat through fatty acid oxidation. This helps eliminate fat from the body. It is not the caffeine itself, as caffeine in doses equivalent to what exists in green tea is not as thermogenic or as efficient at oxidizing fatty acid.

Epigallocatechin gallate (ECGC) is key catechin in green tea that has been widely studied. ECGC in combination with caffeine, as exists in green tea, has shown synergistic properties of increasing fat oxidation and thermogenesis beyond what either component does alone. Researchers believe the combination of these two products together also synergistically increases the release of norepinephrine from the sympathetic nervous system enhancing thermogenesis better than either ingredient alone. This is expected as ECGC and caffeine work by different mechanisms to increase norepinephrine.

Some researchers believe green tea works by additional mechanisms to induce weight loss. The green tea may work by both reducing energy intake and increasing energy expenditure. Though green tea contains several catechins, ECGC uniquely has been shown to decrease food intake. Green tea has also demonstrated an increase in 24-hour human energy expenditure. Green tea is an antioxidant and can limit the damage that occurs from the accumulation of metabolic waste products (ketones and lipid peroxides) that result from weight loss and the burning of fat. These waste products impair the body's ability to metabolize fat for energy and lead to fatigue. Green tea can improve fat burning metabolism and give increased energy while dieting. Additionally, ECGC has been shown to reduce the total triglycerides stored in fat cells, thus decreasing fat storage.

Thus fiber and green tea both have numerous mechanisms by which they aid in weight reduction. This supplement produced satiety with fiber alone. The addition of green tea is believed to enhance weight loss. Green tea is a preferred embodiment of this supplement as indicated in Example 1A and Example 6.

The simplicity of this supplement, the fact that the individual does not have to refrain from foods they crave, provides long-term success and ultimately the goal of ideal body weight.

The ultra-high fiber supplement is made by blending the specific fibers and additional ingredients in a large mixer. No special processing is needed. The dry beverage mix is then placed in single or multi-dose containers. The supplement can be put in individual packets for convenience. The supplement can be added to other ingredients and used to make non-beverage comestibles such as snack bars and puddings.

This powder can be mixed with any edible liquid. The preferred liquid is water—any and all forms of potable water. Potable water has no calories and is ubiquitous adding no calories and element of convenience in preparation. Alternatively, the powder can be added to other liquids, such as fruit juices, providing additional flavor and choices to the user. The preferred embodiment is to mix each one scoop of the dry powder mix in 8–24 preferably 10–20 ounces of water.

The beverage powder is used in the following manner.

One serving consists of 14 or more grams of fiber that is consumed in two divided doses. Each dose consists of 7 or more grams of fiber along with sweetener, flavorants, and any additional ingredients discussed in the alternative embodiments. The supplement dry powder mix fills a scoop that is about 25–30 cc in size. The scoop can be significantly larger if the additional ingredients listed in the alternative embodiments are added. The dry powder supplement mix is ideally added to 8–20 ounces of water or other preferably low calorie liquid. By using more than 8 ounces of liquid the individual can reduce the flavor and sweetness. By using only 8 ounces of liquid the flavor and sweetness is strengthened.

Method For Limiting Caloric Consumption of a Meal:

Approximately one hour prior to a meal the first portion of the serving is taken. The individual measures out 1 scoop (approximately 30 cc) of dry powder mix from either an individual serving packet or container or a multi-dose container. This packet weighs about 8.5–10 grams and contains approximately 7–8.5 grams of fiber. Liquid (8–20 ounces and preferably 12–16 ounces) is added to a shaker type cup with lid. The dry powder beverage mix is poured into the cup. The lid is sealed. The cup is then vigorously shaken for 3–30 seconds preferably 5–15 seconds. The beverage is then consumed.

Approximately 30 minutes prior to the proposed meal, the individual repeats the process, adding 8–20 ounces of liquid to the shaker cup, and adding an additional (one) scoop (about 30 cc) of the dry beverage mix. The lid is sealed, the beverage is shaken, and then consumed. This completes the process. Satiety will occur and the individual's caloric consumption will be reduced at mealtime. The satiety is typically long lasting and will extend beyond the meal hour and prevent the urge to snack.

The dry beverage mix may be used in this fashion from once to up to eight times per day (before meals and for snack reduction). I believe that most individuals will achieve satiety and safe weight loss using one to two servings per day.

It was observed during testing of this supplement that some people experienced good satiety with only one scoop (30 cc of dry mix containing 7–8.5 grams of fiber) or half the serving size. If satisfactory satiety occurs with one scoop or half the serving size, the additional scoop is optional. Thus this supplement produces satiety in some individuals using only one half the serving size (one scoop) between 20–90 minutes preferably 30–60 minutes before the meal. The serving size consisting of a scoop approximately 30 and 60 minutes before the meal works best for individuals with a strong appetite or difficult to control satiety.

An alternative method can be tried for individuals who require the full serving size to achieve satiety. The individual may add two scoops of dry beverage mix to 16–24 ounces of liquid, preferably water 30–60 minutes before the proposed meal. The mixture is vigorously shaken for 3–30 seconds and then consumed.

Method of Using the Ultra-Fiber Supplement to Limit Snacking:

This supplement can also be used just to attenuate or stop the urge to snack. Some individuals at or near ideal body weight do not desire to lose weight but rather wish to maintain their current weight. Some of these individuals struggle with the urge to snack on tasty, high-calorie, high-fat foods. This struggle can create stress, guilt, and depression. This supplement can reduce the craving to snack.

Most people using this supplement correctly to limit caloric consumption of a meal will observe long-lasting satiety that carries over several hours after the meal and curbs the feelings to snack between meals.

If the individual typically has a time of day in which the urge to snack is intense, then approximately 60 minutes prior to this time the individual mixes and consumes one scoop of the mix as before.

Approximately 30 minutes prior to the proposed snack, the individual repeats the process, satiety occurs and the individual's craving for snacking is greatly reduced or eliminated entirely.

For individuals who have sudden urge to snack are encouraged to disregard any timing issue and just prepare the beverage and consume it as above. They may consume a half serving (one scoop of the dry beverage mix in 8–20 ounces of liquid or if strong urge to snack, they can take up to one full serving). The individual may add between one to two scoops to 12–24 ounces of liquid, shake and consume, or they may drink one-half serving and follow it with the second-half serving. Since satiety generally takes 5–60 minutes to occur, the invention works best if the individual can keep busy or distracted for a short period of time before actually consuming the snack.

In testing of this product it was found that some individuals experienced satiety and turned off the craving for snacking at one-half the normal serving size. An individual depending on their cravings may customize how the beverage is taken. Individuals with strong cravings may need the full serving whereas, weaker cravings can respond to one-half serving size.

An alternative method can be tried for individuals who require the full serving size to stop snack cravings. The individual may add two scoops of dry beverage mix to 18–24 ounces of liquid, preferably water 30–60 minutes before the proposed snack. This method works well even if taken at the urge to snack. The mixture is vigorously shaken for 3–30 seconds and then consumed. The individual then keeps busy or distracted for a short time allowing satiety to occur.

This nutritional supplement provides a high, yet palatable, sapid concentration of fiber that is dosed in a manner that reduces side effects of fiber. Fiber typically causes gastrointestinal discomfort, such as bloating, abdominal pain, and diarrhea. Increased fiber means increased symptoms. This ultra-fiber supplement includes using at least three fibers, guar, oat, and psyllium of specific physical characteristics that allows the concentration of fiber.

The following is a method of use that limits gastrointestinal discomfort despite the ultra-high daily dose of fiber.

Minimizing Gastrointestinal Symptoms of Ultra-High Fiber Beverage:

Fiber products tend to create symptoms of bloating, flatulence, diarrhea, and abdominal pain. These symptoms are dramatically reduced or eliminated by following a schedule for the first 10–14 days. On days 1–3 only one-half scoop is consumed. On days 4–6 one-full scoop is consumed. On days 7–10 one-and-a-half scoops are consumed. On days 11–14 one-and-a-half to two scoops are consumed. Individuals having little or no symptoms on day 10 can typically increase to two scoops per day. Individuals having any symptoms on day 10 are encouraged to stay on one-and-a-half scoops till day 14. On day 14 two scoops can be taken.

Individuals can increase to 4 scoops per day or more after day 14. Any symptoms present at that time typically resolve within 2–3 weeks.

Health Advantages of the Ultra-High Fiber Supplement:

The health benefits of fiber are well known as many diseases are improved or outright prevented by the use of fiber.

Cardiovascular disease is the leading cause of death in this country and accounts for one out of every two deaths. There are numerous risk factors for cardiovascular disease some modifiable and some not. Of the modifiable ones, diet provides several risks. Diets high in cholesterol, saturated fat, trans fatty acids, and uric acid, all contribute to vascular disease. Obesity, a condition whereby too many calories are consumed is also a risk factor. High fiber diets are considered cardioprotective by scientists, researchers and governmental agencies including the American Heart Association. Fiber reduces cardiovascular risk by several mechanisms. It can help lead to weight reduction, it can absorb some of the fats and cholesterol and eliminate them as waste, and the fibers can actually lower cholesterol and lipids through indirect and direct measures. This supplement provides ultra-high fiber consumption. It contains 7 or more grams of fiber per serving to help attain a goal of ideal body weight.

Additionally, guar gum has been shown in multiple studies to lower lipids. (Superko 1985). This supplement provides ultra-high dose guar. Another benefit of this supplement is that it contains ultra-high dose of oat fiber. Oat fiber is scientifically recognized as a cardiovascular risk reducer. This supplement also contains green tea as one of the embodiments, an antioxidant that is scientifically proven to be cardiovascular protective and to dilate blood vessels. This supplement contains folic acid as another embodiment, the scientifically accepted treatment to reduce homocysteine and thereby help protect against cardiovascular disease.

Hyperlipoproteinemia, hyperlipidemia, and hypertriglyceridemia are many times diet-related diseases that lead to all forms of cardiovascular disease. Fiber has been shown to improve lipids, lipoproteins, and triglycerides and thereby lessen the damage and risk of cardiovascular disease. Bile acids and cholesterol are made in the body by a common pathway. Fiber absorbs bile acids thereby adjusting the pathway to produce more bile acids and less cholesterol. Hence, fiber reduces the body's production of cholesterol. Guar itself can improve these abnormalities directly. Oat fiber has the American Heart Association's approval for lowering cholesterol.

Homocysteinemia is a condition whereby plasma levels of the amino acid homocysteine are too high. Numerous scientific and medical studies over the past one to two decades have shown the vascular damaging effects of homocysteine and the increased risk of coronary artery disease, stroke, and peripheral vascular disease. Despite the widespread news and scientific coverage homocysteine has received in the past few years, most people are unaware what their actual plasma level is. The damage from homocysteine occurs silently, so there are no warning signs before disease occurs. The simplest, most effective way to treat homocysteinemia is to take folic acid. Folic Acid serves lowers plasma homocysteine levels. This supplement provides folic acid in an embodiment that can aid in the treatment of homocysteine levels and aid in cardiovascular risk reduction.

Doctors now recognize that cardiovascular disease is an inflammatory condition. Cardiovascular inflammation is now a target of both treatment and prevention of heart disease. The cardiovascular inflammation is measurable and represents a newly discovered treatable risk factor for heart disease. This risk is independent of an individual's cholesterol level. The inflammation can be measured by a blood test called high sensitivity C-reactive protein (hs-crp). The test results are quantified in quintiles with quintile 1 and 2 projecting low to mild risk of heart disease and quintiles 4 and 5 projecting high risk of heart disease. Hs-crp is not just a marker of heart disease, it directly causes damage to the vessels and plaque within those vessels. Hs-crp levels are increased with increased body mass making it a diet-related disease. Researchers believe that adipose (fat) tissue is a source of interleukin-6, the main cytokine mediator that circulates to the liver where it turns on production of C reactive protein. Weight loss results in decreased body mass thereby decreasing interleukin-6 levels and ultimately decreasing hs-crp and cardiovascular inflammation in general. This supplement offers an easy way to lose weight and reduce hs-crp levels.

Glucose Intolerance (same as impaired glucose tolerance) and diabetes are greatly increasing in prevalence in the United States. The increase mirrors the increase in body mass and increase in sedentary life style that has occurred. Diabetes Mellitus (DM) is a medical disease characterized by too much glucose in the blood. It is a disorder of carbohydrate metabolism that involves absolute or relative insulin deficiency. Glucose intolerance is a medical condition whereby criteria are not met for the diagnosis of diabetes yet glucose/insulin metabolism is not normal. Glucose intolerance is pre-diabetic state that carries the risk of all the sequele that occurs with overt diabetes. Glucose intolerance left untreated, frequently progresses to diabetes. This invention helps to treat or reduce the risk of developing both glucose intolerance and DM.

This ultra-high fiber supplement causes weight reduction, a key cornerstone in preventing, reversing, and treating both glucose intolerance and DM. It is well known that having an increased body mass leads to insulin resistance and that many times even small or moderate weight loss will reverse this insulin resistance. This supplement allows for a safe and convenient way to reduce weight and achieve a goal of ideal body weight. The ultra-high fiber beverage also improves glucose metabolism. A typical diet in most diabetics is too high in fat and simple carbohydrates, leading to increased body mass and eventually obesity. Consumption of excess calories adds to the obesity, increases insulin resistance, and explains why most diabetics are not under perfect glucose control.

Ultra-high fiber diets offer several advantages. Fiber absorbs some of the fat and carbohydrates preventing absorption, and assimilation by the body thereby decreasing glucose into the body. The fiber also serves as a bulking agent to speed transit of fat and carbohydrates through the body. Ultra-high fiber has an additional advantage of promoting satiety, which reduces the fat and carbohydrates consumed at a meal and promotes long-acting satiety that decreases or eliminates the craving to snack.

Metabolic Syndrome, sometimes called Syndrome X, is a common medical disorder characterized by multiple major risk factors for cardiovascular disease. This includes elevated blood pressure, insulin resistance (with or without glucose intolerance), elevated triglycerides, small LDL particles, low HDL cholesterol, abdominal obesity, and prothrombic and proinflammatory states. Individuals with metabolic syndrome are at extreme risk for cardiovascular disease. This invention can help reduce the risk of developing or treat metabolic syndrome by giving weight reduction. Ultra-high fiber diet can lower blood pressure, reverse insulin resistance, reduce the number of small LDL particles, increase HDL cholesterol, reverse some prothrombic and proinflammatory states and reduce weight to ideal body weight. These effects are due to the fact that ultra-high fiber absorbs some of the fat and carbohydrates preventing absorption and assimilation, and speeds their transit through the body. The ultra-high fiber also promotes satiety so that less calories are consumed at a meal and snacking is reduced. This caloric reduction leads to weight loss, which improves many of the abnormalities that make up the metabolic syndrome.

Cancer is the second leading cause of death after heart disease. It is well known that 30–40% of cancers are felt to be diet related. Obesity represents a risk factor for several types of cancer. Certain elements within the diet can also lead to cancer such as high fats, nitrosamines, heterocyclic amines, polycyclic aromatic hydrocarbons, certain preservatives, toxins in foods, etc. This supplement seeks to help in reducing the risk of developing and or aiding in the treatment some forms of cancer. Some cancers related to obesity, some are related to a low fiber diet. Offering an ultra-high fiber diet helps to reduce the chance of developing these types of cancer. This ultra-high fiber diet offers weight reduction down to ideal body weight helping to prevent certain cancers.

Another mechanism of developing cancer deals with toxic ingestion. Certain toxins, and chemicals are known carcinogens. Ingesting these carcinogens increases the risk an individual has in developing cancer. Preventing ingestion of these toxins can reduce the risk. This ultra-high fiber absorbs some of the fat, carbohydrates, nutrients, toxins and carcinogens preventing absorption and assimilation, and speeds their transit through the body.

Antioxidants are now known to help reduce the risk of developing or treat certain cancers. This invention contains green tea and multianthocyanidins. Green tea has been shown in medical research to have anti-cancer and anti-mutagenic effects. Multianthocyanidins are potent phytochemicals from a variety of berries that fight free radicals and oxidation and are felt to offer protection against certain forms of cancer.

Elevated blood pressure or hypertension is a common medical disorder that affects up to 60% of the population. Hypertension is a risk factor for cardiovascular disease, kidney disease, dementia, and macular degeneration. It is well known that obesity represents a risk factor for hypertension. It is also well known that mild to moderate weight loss can lower blood pressure. This supplement seeks to help lower blood pressure. It does this by helping an individual reach an ideal body weight. The green tea within the product helps to lower blood pressure by helping to dilate or expand he blood vessels. The plant compounds in green tea help improve artery function and helps normalize the nitric oxide release within the vessel wall. This promotes good vascular health and helps dilate the vessels, further aiding in blood pressure reduction.

Constipation, diverticulosis, hemorrhoids, and irritable bowel syndrome are all forms of digestive disease that are extremely common in the population. These diseases are generally tied to a low fiber diet. Increasing the fiber can help prevent, reverse, or treat these diseases. Ultra-high fiber in this supplement helps promote good bowel health.

Sleep Apnea is a disorder of breathing that occurs while sleeping. It is a hidden epidemic as it is very prevalent in the population yet remains undiagnosed in most. Sleep Apnea causes cardiovascular disease, headaches, impotence, cognitive dysfunction and extreme sleepiness and fatigue. One of the cornerstones in treatment of sleep apnea is weight reduction. Sometimes even small to moderate weight loss can reduce the risk of developing or treat sleep apnea. This supplement seeks to help prevent or treat sleep apnea by offering a convenient and easy way to reduce weight. The ultra-high fiber beverage induces satiety that results in calorie reduction at mealtime, and absorbs fats and other nutrients speeding their transit through the body. The satiety is long acting and this serves to help decrease snacking and thereby promote further weight reduction.

The ultra-high fiber supplement is useful as a nutritional drink for enhancing fiber and nutrients. It tastes good and has good organoleptic and palatable properties. Despite the ultra-high fiber load, the fiber mixes well in liquid, and avoids immediate clumping and gelling. In the alternative embodiments a variety of health enhancing (i.e. antioxidants, vitamins, herbs and botanicals) ingredients enhance the supplement. This supplement would be especially useful as a sports drink whereby numerous ingredients (i.e. carbohydrates, proteins, vitamins, and electrolytes) are added to enhance physical performance and muscle growth. The supplement would also be useful in elderly and debilitated individuals who are calorie or protein deficient. The supplement could serve as a source of fiber and health-enhancing ingredients (i.e. vitamins, antioxidants, carbohydrates, fats, and protein). This provides a way to enhance protein and calories in individuals who are do not eat well or are debilitated such as the elderly, individuals with chronic illnesses or burn and trauma victims. This ultra-fiber supplement provided as a beverage, snack bar or pudding form provides numerous ways to enhance health.

DESCRIPTION OF ALTERNATIVE EMBODIMENTS

The dry beverage mix can be enhanced with more fiber by adding a variety of fibers to the original base of guar, oat, and psyllium fibers. In using additional fibers with different physical characteristics health benefits are enhanced. For example some fibers absorb cholesterol better than others and some fibers absorb water better and promote satiety better than other fibers.

Additional fibers can be added from any fiber safe for human consumption, including but not limited to the following group: locust bean gum, pectin, glucomannan, barley fenugreek gum, quince seed gum, pectin, Irish moss, acacia gum, arabic gum, ghatti gum, karaya gum, tragacanth, carageenan, alginate, xanthan gum, methylcellulose, hydroxypropylcellulose and carboxymethylcellulose.

While I believe that most of these fibers will work with the above three-fiber base, I have found the following two additional fibers to work extremely well.

The fiber coming from locust bean gum (Certonia Siliqua (L.) Taub.) either hydrolyzed, partially hydrolyzed or non-hydrolyzed works well. Locust bean gum having a granulation between 99% through a standard US 100 mesh screen through 99% minimum through a US 300 mesh screen, a viscosity of 500–6000 cps in 1% aqueous solution when run on a Brookfield Viscometer RVT spindle #3 at 20 RPM, heated to 85° Celsius and then cooled to 25° Celsius. The quantity of locust bean gum is between 0.1–15 grams and 0.017–7% solution.

The preferred locust bean gum is food grade, nonhydrolyzed with granulation of 35% minimum through a US standard 120 mesh screen, 30% minimum through a US standard 140 mesh screen, and 5% minimum through a US standard 200 mesh screen and having a viscosity of 2000–4500 cps in 1% aqueous solution when run on a Brookfield RVT spindle #3 at 20 RPM, at 25° Celsius. The preferred quantity based on two-scoop-per-serving regimen is 1.5–4 grams and 0.2–1.7% solution (weight—weight) at 25° Celsius. Locust bean gum has satiating and cholesterol absorbing properties.

Thus Example 2 represents the ultra-high fiber supplement with added fiber. (Example 2 comprises Example 1 with locust bean gum added.

EXAMPLE 2

| Ingredient | grams per serving based on 2-scoop-per serving |
| --- | --- |
| Guar | 2–12 |
| Oat fiber | 1–15 |
| Psyllium husk | 0.5–10 |
| Locust bean gum | 0.1–15 |
| Flavoring Agent | 0.1–10 |

This supplement can be blended as in Example 1. The supplement is mixed with liquid and taken as previously described.

The other fiber that I have found to work well is pectin. Pectin has excellent cholesterol lowering properties and is satiating as well. The fiber from pectin. Any source of edible pectin that is not harmful to humans, including esterified and non-esterified pectin, including methoxylated and non-methoxylated pectin. The Pectin dosage is 0.1–15 grams per serving and gives a solution of 0.01–7% based on the two-scoop regimen above.

The preferred pectin is a high methoxyl citrus pectin that has a degree of esterification of 60–95%. The preferred dosage is 0.5–4 grams per serving and a solution of 0.08–1.7% based on the two-scoop regimen above.

Thus Example 3 represents the ultra-high fiber supplement with another added fiber. (Example 3 comprises Example 1 with pectin added.

EXAMPLE 3

| Ingredient | grams per serving based on 2-scoop-per serving |
| --- | --- |
| Guar | 2–12 |
| Oat fiber | 1–15 |
| Psyllium husk | 0.5–10 |
| Pectin | 0.1–15 |
| Flavoring Agent | 0.1–10 |

This supplement can be blended as in Example 1. The supplement is mixed with 8–20 ounces of liquid and taken as previously described.

In an alternative preferred embodiment, multiple fibers can be added to enhance satiety, weight loss, and health benefits. I have found that adding both the locust bean gum and the pectin (Example 4) to the three fiber base provides a palatable and organleptically pleasing drink with increased benefits.

Thus Example 4 represents the ultra-high fiber supplement with additional fibers. (Example 4 comprises Example 1 with locust bean gum and pectin added).

EXAMPLE 4

| Ingredient | grams per serving based on 2-scoop-per serving |
| --- | --- |
| Guar | 2–12 |
| Oat fiber | 1–15 |
| Psyllium husk | 0.5–10 |
| Locust bean gum | 0.1–15 |
| Pectin | 0.1–15 |
| Flavoring Agent | 0.1–10 |

This supplement is blended as in Example 1. The supplement is mixed with 8–20 ounces of liquid and taken as previously described.

Another embodiment of this supplement (Example 5) is to add antioxidants to the base fibers. The antioxidant can be from any vitamin, mineral, herb, botanical, or coenzyme that has antioxidant activity. Antioxidants help prevent a variety of diseases and protect cells and tissues from free radical damage. Antioxidants have anti-aging benefits.

Thus Example 5 represents the ultra-high fiber supplement with antioxidants added. (Example 5 comprises Example 1 with the antioxidant vitamin C added.

EXAMPLE 5

| Ingredient | grams per serving based on 2-scoop-per serving |
| --- | --- |
| Guar | 2–12 |
| Oat fiber | 1–15 |
| Vitamin C | .01–10 |
| Flavoring Agent | 0.1–10 |

This supplement is blended as in Example 1. The supplement is mixed with 8–20 ounces of liquid and taken as previously described.

In another embodiment, the supplement can be enhanced with any variety of tea (Example 6). Green tea is the preferred embodiment. Green tea is scientifically proven to burn fat, promote weight loss, and provide numerous health benefits including improved cardiovascular function and reduced risk of developing a variety of cancers.

Thus Example 6 represents the ultra-high fiber supplement with the addition of tea. (Example 6 comprises Example 1 with green tea added.

EXAMPLE 6

| Ingredient | grams per serving based on 2-scoop-per serving |
| --- | --- |
| Guar | 2–12 |
| Oat fiber | 1–15 |
| Psyllium husk | 0.5–10 |
| Green tea | .01–10 |
| Flavoring Agent | 0.1–10 |

This supplement is blended as in Example 1. The supplement is mixed with 8–20 ounces of liquid and taken as previously described.

In another embodiment of the supplement, one or more vitamins are added. This includes any vitamin safe for human consumption. Vitamins are necessary for good health and disease prevention. Vitamins are essential to proper cell, tissue, and organ function. Vitamins also protect cells and tissues. Vitamins provide anti-aging benefits and help prevent cardiovascular disease, cancer, and a variety of diseases.

Thus Example 7 represents the ultra-high fiber supplement with the addition of a vitamin. (Example 7 comprises Example 1 with folic acid, vitamin B9, added.

EXAMPLE 7

| Ingredient | grams per serving based on 2-scoop-per serving |
| --- | --- |
| Guar | 2–12 |
| Oat fiber | 1–15 |
| Psyllium husk | 0.5–10 |
| Folic Acid | .001–10 |
| Flavoring Agent | 0.1–10 |

This supplement is blended as in Example 1. The supplement is mixed with 8–20 ounces of liquid and taken as previously described.

In another embodiment of the supplement (Example 8), an ingredient selected from the group of nutritional supplements, herbs, botanicals, minerals, and coenzymes are added. These ingredients provide numerous health and longevity benefits including reducing the risk of developing cardiovascular disease, cancer, and dementia. Many of these ingredients protect cells and tissues.

Thus Example 8 represents the ultra-high fiber supplement with the addition of an ingredient selected from the group of nutritional supplements, herbs, botanicals, minerals, and coenzymes. (Example 8 comprises Example 1 with the mineral zinc added.

EXAMPLE 8

| Ingredient | grams per serving based on 2-scoop-per serving |
| --- | --- |
| Guar | 2–12 |
| Oat fiber | 1–15 |
| Psyllium husk | 0.5–10 |
| Zinc | .001–.2 |
| Flavoring Agent | 0.1–10 |

This supplement is blended as in Example 1. The supplement is mixed with 8–20 ounces of liquid and taken as previously described.

The supplement can also be enhanced with one or more carbohydrates. This can improve taste or serve as a source of energy. Carbohydrates contain calories which is useful for further nutritional supplementation. The ultra fiber supplement enhanced with carbohydrates can serve as a variety of benefits including meal replacement, and as a sports energy drink whereby additional carbohydrates can serve as an energy source. The preferred embodiment does not include additional carbohydrates as they serve as a sugar source and a source of calories. The carbohydrates used can include any carbohydrate safe for human consumption.

Thus Example 9 represents the ultra-high fiber supplement with the addition of carbohydrate. (Example 9 comprises Example 1 with carbohydrate added.

EXAMPLE 9

| Ingredient | grams per serving based on 2-scoop-per serving |
| --- | --- |
| Guar | 2–12 |
| Oat fiber | 1–15 |
| Psyllium husk | 0.5–10 |
| Carbohydrate | .1–100 |
| Flavoring Agent | 0.1–10 |

This supplement is blended as in Example 1. The supplement is mixed with 8–20 ounces of liquid and taken as previously described In another embodiment of the supplement (Example 10), protein is added. Protein serves to build tissue and is essential to metabolism. The protein can come from any source of protein safe for human consumption. Adding protein can provide a variety of benefits including meal replacement, protein enhancement, muscle-building, and energy enhancement. The protein is especially useful in muscle-builders, athletes, trauma and burn victims. The preferred protein is whey protein from 0.5–20 grams per serving.

Thus Example 10 represents the ultra-high fiber supplement with the addition of whey protein. (Example 10 comprises Example 1 with whey protein added).

EXAMPLE 10

| Ingredient | grams per serving based on 2-scoop-per serving |
| --- | --- |
| Guar | 2–12 |
| Oat fiber | 1–15 |
| Psyllium husk | 0.5–10 |
| Whey protein | .001–50 |
| Flavoring Agent | 0.1–10 |

This supplement is blended as in Example 1. The supplement is mixed with 8–20 ounces of liquid and taken as previously described The supplement can also be enhanced with fat (Example 11). Fat is a source of calories that can be used to enhance taste, satiation, and energy. Any fat safe for human consumption can be used. Monounsaturated and polyunsaturated fats are preferred over the less healthy saturated fats. Adding fat to the supplement can improve taste, and satiety, and adds a source of energy-calories to energy or nutritionally depleted individuals.

Thus Example 11 represents the ultra-high fiber supplement with the addition of fat. (Example 11 comprises Example 1 with the fat added.

EXAMPLE 11

| Ingredient | grams per serving based on 2-scoop-per serving |
| --- | --- |
| Guar | 2–12 |
| Oat fiber | 1–15 |
| Psyllium husk | 0.5–10 |
| Fat | .001–30 |
| Flavoring Agent | 0.1–10 |

This supplement is blended as in Example 1. The supplement is mixed with 8–20 ounces of liquid and taken as previously described In another embodiment the supplement can have an ingredient added selected from the group of stimulants, thermogenic agents, and lipogenesis inhibitors. Stimulants act to speed up metabolism and burn calories. Some examples of stimulants include caffeine, ma huang, white willow bark, ephedra, ephedrine, and kola nut. Thermogenic compounds increase the basic metabolic rate, body temperature, and heat energy resulting in the burning of fat. Some examples include the above mentioned stimulants, L-phenylalanine, and L-tyrosine.

Lipogenesis inhibitors like (−)-hydroxycitric acid(HCA), slow the production of fats from the metabolism of proteins and carbohydrates. This results in decreased fat storage. The stimulants, thermogenics, and lipogenesis inhibitors that can be used are all synthetic and natural forms.

Thus Example 12 represents the ultra-high fiber supplement with the addition of a lipogenesis inhibitor. (Example 12 comprises Example 1 with (−)-hydroxycitric acid, (HCA).

EXAMPLE 12

| Ingredient | grams per serving based on 2-scoop-per serving |
| --- | --- |
| Guar | 2–12 |
| Oat fiber | 1–15 |
| Psyllium husk | 0.5–10 |
| HCA | .05–10 |
| Flavoring Agent | 0.1–10 |

This supplement is blended as in Example 1. The supplement is mixed with 8–20 ounces of liquid and taken as previously described.

In another alternative embodiment, lipotropic agents can be added. Lipotropic agents include choline, phosphatidyl choline, methionine, inositol, dandelion root, bearberry, barberry, tumeric, silymarin, wall germander and Oregon grape root. Lipotropics prevent accumulation of fat in the liver and aid in detoxification of toxins and metabolic waste. They also emulsify fats so they can be transported in the blood. Lipotropics also play a role in digestion and bile secretion. Thus Example 13 represents the ultra-high fiber supplement with the addition of a lipotropic. (Example 13 comprises Example 1 with choline.

EXAMPLE 13

| Ingredient | grams per serving based on 2-scoop-per serving |
| --- | --- |
| Guar | 2–12 |
| Oat fiber | 1–15 |
| Psyllium husk | 0.5–10 |
| choline | 0.1–2 |
| Flavoring Agent | 0.1–10 |

This supplement is blended as in Example 1. The supplement is mixed with 8–20 ounces of liquid and taken as previously described.

One or more preservatives may be added to the supplement. Any preservative that is safe for human consumption may be added. The preservative may be used to enhance shelf-life, though does not appear to be necessary at this time. The preferred composition does not contain preservatives.

Additional ingredients can be added that either exist now, or will be discovered or synthesized. These ingredients include any substance that is safe for human consumption that can aid in satiety and or weight reduction, enhance health, or reduce the chance of developing disease, and help slow or reverse the aging process.

Non-Beverage Alternatives:

Another embodiment of the supplement is that the ultra-high fiber can be delivered in forms other than a beverage. The preferred ingredients can be used to make other ultra-high fiber food items, such as pudding, or snack bars that offer the same health benefits of the ultra-high fiber beverage. The supplement can be delivered as a comestible in a form selected from the group consisting of liquids, semi-solids and solids (Example 14). Snack bars and puddings are two alternative forms to the beverage. The snack bars and puddings offer variety in how the ultra fiber can be consumed and offer convenience in that they are ready made and easy to travel with. The snack bars are made either as one bar containing 7 or more grams of fiber, or as a two bar set with each bar containing 7 or more grams per fiber. The pudding contains 7 or more grams of fiber per serving or in a double portion container containing a total of 14 or more grams of fiber. The container comes with a lid so part of the pudding can be consumed and part saved for later. While the beverage can be made without added fats, carbohydrates and proteins, the snack bars and puddings will require some additional ingredients selected from the group of carbohydrates, fats and proteins.

Thus Example 14 represents the ultra-high fiber supplement in the form of a snack bar. (Example 14 comprises Example 1 made in the form of a snack bar.

EXAMPLE 14

| Ingredient | grams per serving based on 2 portions per serving. |
|---|---|
| Guar | 2–12 |
| Oat fiber | 1–15 |
| Psyllium husk | 0.5–10 |
| Carbohydrates | 1–200 |
| Flavoring Agent | 0.1–10 |

The snack bar is made by mixing the above ingredients with additional ingredients commonly used in making snack bars. The mixture is then baked in an oven. The snack bars can then be coated with a carob or yogurt covering to enhance their taste. The snack bars can be packaged in different sizes individually or in multi-dose wrappers.

Operation of the Ultra-High Fiber Snack Bars:

Method for Limiting Caloric Consumption of a Meal Using Snack Bars:

The snack bars contain 7–30 grams of fiber per bar. The bar is packaged as either one large bar (14 or more grams of fiber) or two smaller bars (each containing 7 or more grams of fiber) in one wrapper. The smaller bars can also exist as individual bars each containing 7 or more grams of fiber.

One hour prior to a proposed meal, the individual consumes one small bar or one-half a large bar. The individual also drinks 8–20 ounces of liquid. The liquid is preferably water or a low-calorie beverage.

Thirty minutes prior to the proposed meal, the individual then consumes another small bar or the other one-half of the large bar with 8–20 ounces of liquid. The preferred liquid in all examples is water or a low calorie beverage.

Satiety will occur within 5–60 minutes of consuming the snack bar. If full satiety is reached after consuming one small bar or one-half the large bar then the other small bar or one-half of the large bar is optional.

For individuals who require the two small bars or the full large bar to achieve satiety there is an optional method to achieve satiety.

In this method, the individual eats two small bars or one large bar 30–60 minutes prior to the proposed meal. The individual must drink 8–24 ounces of water or other low-calorie beverage with the snack bar. It is recommended that at least 12 ounces of liquid be consumed.

Method for Limiting Snacking Using Snack Bars:

The nutritional supplement snack bar can be used to attenuate or completely halt the urge to snack. For individuals who choose to snack at the same time each day it is recommended they consume one small bar or one-half the large bar 60 minutes before the proposed snack time with 8–20 ounces of water. Thirty minutes before the proposed snack time the individual then consumes the other small bar or other one-half of the large bar with 8–20 ounces of water. Since satiety typically takes 5–60 minutes after consuming the bar, it is best if the individual keeps busy for a short time before attempting to eat the snack.

Some individuals will achieve full satiety on one small bar or one-half the large bar. In this case, the other small bar or one-half of the large bar is optional.

For individuals who require the two small bars or the full large bar to achieve satiety there is an optional method to decrease snacking.

In this method, the individual eats two small bars or one large bar 30–60 minutes prior to the proposed snack. The individual must drink 8–24 ounces of water or other low-calorie beverage with the snack bar. It is recommended that at least 12 ounces of liquid be consumed.

The ultra-high fiber supplement can also be served in the form of a pudding. This provides an easy way to consume the high fiber especially for very young or elderly (edentulous) individuals. The pudding also serves as an additional option over the beverage and snack bars providing an element of variety.

Thus Example 15 represents the ultra-high fiber supplement in the form of a pudding. (Example 15 comprises Example 1 made in the form of a pudding.

EXAMPLE 15

| Ingredient | grams per serving based on 2 portions per serving. |
|---|---|
| Guar | 2–12 |
| Oat fiber | 1–15 |
| Psyllium husk | 0.5–10 |
| Carbohydrates | 1–200 |
| Flavoring Agent | 0.1–10 |

The pudding is made by mixing the listed ingredients with additional ingredients commonly used in making pudding. The mixture is first heated and then allowed to cool. The ingredients are then put into individual or multi-dose containers.

Operation of the Ultra-High Fiber Pudding:

Method for Limiting Caloric Consumption of a Meal Using Pudding:

The pudding contains 7–30 grams of fiber per container. The container is packaged as either one large container (14 or more grams of fiber) or smaller containers (each containing 7 or more grams of fiber).

One hour prior to a proposed meal, the individual consumes one small container or one-half a large container. The individual also drinks 8–20 ounces of liquid. The liquid is preferably water or a low calorie beverage.

Thirty minutes prior to the proposed meal, the individual then consumes another small container or the other one-half of the large container with 8–20 ounces of liquid. The preferred liquid in all examples is water or a low calorie beverage.

Satiety will occur within 5–60 minutes of consuming the container. If full satiety is reached after consuming one small container or one-half the large container then the other small container or one-half of the large container is optional.

For individuals who require the two small containers or the complete large container to achieve satiety there is an optional method to decrease the caloric consumption of a meal.

In this alternative method, the individual eats two small containers or one large container 30–60 minutes prior to the proposed snack. The individual must drink 8–24 ounces of water or other low-calorie beverage with the pudding. It is recommended that at least 12 ounces of liquid be consumed.

Method for Limiting Snacking Using Pudding:

The nutritional supplement pudding can be used to attenuate or completely halt the urge to snack. For individuals who choose to snack at the same time each day it is recommended they consume one small container or one-half the large container 60 minutes before the proposed snack time with 8–20 ounces of water. Thirty minutes before the proposed snack time the individual then consumes the other small container or other one-half of the large container with 8–20 ounces of water. Since satiety typically takes 5–60 minutes after consuming the pudding, it is best if the individual keeps busy for a short time before attempting to eat the snack.

Some individuals will achieve full satiety on one small container or one-half the large container. In this case, the other small container or one-half of the large container is optional.

For individuals who require the two small containers or the complete large container to achieve satiety there is an optional method to decrease snacking.

In this alternative method, the individual eats two small containers or one large container 30–60 minutes prior to the proposed snack. The individual must drink 8–24 ounces of water or other low-calorie beverage with the pudding. It is recommended that at least 12 ounces of liquid be consumed.

Minimizing Gastrointestinal Symptoms of Ultra-High Fiber Pudding or Snack Bar:

The ultra-high fiber pudding or snack bar can be taken one to six times per day. They can be used in alone or in combination with each other, or with the ultra-high fiber beverage.

To dramatically reduce or eliminate the gastrointestinal discomfort of bloating, flatulence, diarrhea, and abdominal pain, the ultra-high fiber pudding or snack bar, the following schedule is used for the first 10–14 days.

Days 1–3, only ½ the small bar or small container or ¼ of the large bar or large container. The snack bar or pudding is consumed only once per day during the first three days. Days 4–6, one small snack bar or one small pudding container or ½ the large snack bar or large pudding container is consumed once to twice daily.

Days 7–10, 1½ small snack bars or small pudding containers or ¾ of the large snack bar or large pudding container is consumed once to twice daily.

Days 11–14, two small snack bars or one large snack bar, or two small puddings or one large pudding is consumed one to three times daily. Individuals having little or no symptoms on day 10 can typically increase to 2–3 large snack bars or large pudding containers or combination thereof per day.

Individuals having any symptoms on day 10 are encouraged to stay on ¾ of a large snack bar or large pudding container once to twice daily until day 14. On Day 14 a full large snack bar or large pudding can be consumed once to three times daily. All doses of pudding and snack bar are required to be taken with 8–24 ounces of water or low calorie beverage. After day 14 individuals interested in consuming more fiber can slowly increase the snack bar or pudding until a maximum of six small or three large snack bars or puddings, or any combination thereof, are consumed daily.

The above instructions are meant as guide for using this supplement. The above are just a few of the many possible ways to take this product. Other methods that combine the powder and liquid are also possible (i.e. first adding powder to cup then adding liquid, or using a blender or other agitator rather than shaking, etc.) Other dosing regimens or break in periods are possible.

CONCLUSIONS, RAMIFICATIONS AND SCOPE

Thus the reader will see that this supplement provides an ultra-high fiber beverage, snack bar, and pudding that are easy to consume and provides a healthy method of inducing satiety, caloric reduction and weight loss, while offering many health advantages.

Some of the advantages of this supplement include:
1. It provides a safe, effective, and simple way to lose weight.
2. It provides a healthy way to lose weight.
3. It provides the ability to lose weight without denying the foods an individual desires.
4. It provides the ability to provide long-lasting weight reduction and to avoid yo—yo dieting.
5. It provides the ability to save money by buying less food per meal; an individual consuming this invention will be satiated and eat less.
6. It provides a method for increasing fiber in the diet.
7. It provides a method for improving serum lipids, cholesterol, lipoproteins, and reducing cardiovascular risk.
8. It provides a method for reducing plasma homocysteine and reducing cardiovascular risk.
9. It provides a method of increasing folic acid consumption and reducing cardiovascular risk.
10. It provides a method of increasing antioxidants in the diet.
11. It provides a method of reducing the risk of developing all diet-related diseases.
12. It provides a method of assisting in the treatment of all diet-related diseases.
13. It provides a method of reducing the risk of developing and/or assisting in the treatment of metabolic syndrome.
14. It provides a method of reducing the risk of developing and/or assisting in the treatment of glucose intolerance, insulin resistance, and diabetes.
15. It provides a method of reducing the risk of developing and/or assisting in the treatment of diet-related cancers.
16. It provides a method of reducing the risk of developing and/or assisting in the treatment of hypertension.
17. It provides a method of reducing the risk of developing and/or assisting in the treatment of osteoporosis.
18. It provides a method of reducing the risk of developing and/or assisting in the treatments of sleep apnea.
19. It provides a method of reducing the risk of developing and/or assisting in the treatment of constipation, diverticulosis, hemorrhoids and irritable bowel disease.
20. It provides a method of reducing absorption and assimilation of ingested toxins and or carcinogens and then speeding transit through the body.

While my above description contains many specificities, these should not be construed as limitations on the scope of the invention, but rather as an exemplification of one preferred embodiment thereof. Many other variations are possible.

For example one or more of the following can be added to this supplement including dietary supplements, antioxidants, vitamins, minerals, herbs, botanicals, enzymes, coenzymes, fats, carbohydrates, proteins, metabolism enhancing or thermogenic substances, lipotropic compounds, lipogenesis inhibitors, electrolytes, fillers, emulsifiers, sweeteners, preservatives, and texturing, coloring, and flavoring agents.

Serving size can be changed, the number of doses per day can be changed, the supplement can be used as a meal replacement, diet restrictions or requirements can be added, exercise requirements can be added, meditation can be added, counseling either individual or group could be added, motivational tapes, lectures, or printed materials can be added, prepackaged meals or drinks can be required, electronic or battery operated devices that assist with weight loss can be added, and any combination of drinks, puddings, and snack bars can be used.

Accordingly, the scope of the invention should be determined not by the embodiments discussed, but by the appended claims and their legal equivalents.

I claim:

1. An orally administered nutritional supplement for ingestion by mammals containing at least 7 grams of fiber per serving comprising a composition comprising:
   (a) a mixture of guar, oat, and psyllium fibers, plus,
   (b) at least one flavoring agent, and,
   (c) admixed with at least one potable liquid to create a beverage.

2. The nutritional supplement according to claim 1, wherein said mixture comprises 1–15 grams of guar, 1–15 grams of oat, and 0.5–10 grams of psyllium.

3. The nutritional supplement of claim 1 wherein the supplement is an edible food product selected from the group consisting of liquid food products and semisolid food products.

4. The nutritional supplement according to claim 1, in which the at least one potable liquid is admixed in sufficient quantity to create at least an 8 ounce beverage.

5. The nutritional supplement according to claim 1, in which at least one potable liquid is admixed in sufficient quantity to create at least an 8 ounce beverage.

6. The nutritional supplement according to claim 1 wherein the composition is admixed to create a semisolid comestible.

7. The nutritional supplement according to claim 1, wherein said flavoring agent is a sweetener.

8. The nutritional supplement according to claim 1, further including at least one ingredient that enhances visual and organoleptic appeal selected from the group consisting of coloring agents, preservatives, thickening agents, thinning agents, and emulsifiers.

9. The nutritional supplement according to claim 1, further including at least one antioxidant.

10. The nutritional supplement according to claim 1, further including at least one tea selected from the group consisting of tea leaves, tea flavonoids, tea catechins, and tea polyphenols.

11. The nutritional supplement according to claim 1, further including at least one ingredient selected from the group consisting of vitamins, minerals, coenzymes, electrolytes, botanicals, herbs, anthocyanins, anthocyanidins, beta-carotene, bioflavonoids, catechins, carotenoids, curcuma, dandelion root, epicatechins, flavones, flavonoids, flavonols, teas, tea polyphenols, garlic, ginkgo biloba, grape seed, grape skin, green tea, epigallocatechin-3-O-gallate, indoles, isocyanates, isoflavones, isoflavonoids, isoprenoids, lycopene, organosulfur compounds, phenols, phenolic acids, polyphenolic compounds, pycnogenols, resveratrol, silymarin, terpenes, tannins, thiols, and tocopherols (beta, gamma, and delta), alpha-lipoic acid, coenzyme Q10, n-acetyl-l-cysteine, and organoleptic agents, thickening agents, thinning agents, emulsifiers, coloring agents, preservatives, flavoring agents, sweeteners, stimulants L-carnitine, L-ornithine, L-tyrosine, L-tryptophan, L-phenylalanine, gamma-linolenic acid, chromium, glucose tolerance factor, vanadyl sulfate, Gymnema sylvestere, bromelain, pancreatin, papain curcumin, barberry, bearberry, Teucrium polium, choline, inositol, human growth hormone, DHEA (dehydroepiandosterone), caffeine, xanthines, kola nut, yerbamate, medium chain triglycerides, (−)-hydroxycitric Acid (HCA), kelp, lecithin, dihydroxyacetone, pyruvate, creatine, iodine, and bladderwrack, glutathione peroxidase, superoxide disumutase, lipotropics, phosphatidyl choline, methionine, tumeric, wall germander and Oregon grape root.

12. The nutritional supplement according to claim 1, further including at least one caloric ingredient selected from the group consisting of carbohydrates, fats, and proteins.

13. The nutritional supplement according to claim 1 further including locust bean gum, pectin, green tea, multi-anthocyanidins, folic acid, pyridoxine, and at least one sweetener.

14. A method of improving the health of a mammal comprising orally administering a nutritional supplement containing at least 7 grams of fiber per serving comprising a mixture of guar, oat, and psyllium fibers plus at least one flavoring agent and admixed with at least one potable liquid to create a beverage that is ingested by a mammal at least one time daily whereby consumption results in at least one health benefit achieved by improving at least one medical condition selected from the group of medical conditions consisting of overweight, obesity, fiber deficiency, poor nutrition, insulin resistance, glucose intolerance, diabetes, hypertension, metabolic syndrome, cardiovascular disease, osteoporosis, sleep apnea, constipation, diverticulosis, hemorrhoids, and irritable bowel syndrome.

15. The method according to claim 14, in which at least one potable liquid is admixed to said nutritional supplement of claim 14 in sufficient quantity to create at least an 8 ounce beverage.

16. The method according to claim 14, further comprising:
   (a) admixing the composition to create a semisolid food product,
   (b) said semisolid food product to be accompanied by consumption of sufficient quantity of at least one potable liquid to further hydrate the consumed fiber.

17. The method according to claim 14, further including admixing at least one edible fiber.

18. The method according to claim 14, further including admixing at least one ingredient selected from the group consisting of carbohydrates, fats, proteins, antioxidants, electrolytes, vitamins, minerals, enzymes, coenzymes, botanicals, herbs, anthocyanins, anthocyanidins, beta-carotene, bioflavonoids, catechins, carotenoids, curcuma, dandelion root, epicatechins, flavones, flavonoids, flavonols, tea, tea polyphenols, garlic, ginkgo biloba, grape seed, grape skin, green tea, epigallocatechin-3-O-gallate indoles, isocyanates, isoflavones, isoflavonoids, isoprenoids, lycopene, organosulfur compounds, phenols, phenolic acids, polyphenolic compounds, pycnogenols, resveratrol, silymarin, terpenes, tannins, thiols, and tocopherols (beta, gamma, and delta), alpha-lipoic acid, coenzyme Q10, and n-acetyl-l-cysteine, organoleptic agents, coloring agents, preservatives, flavoring agents, sweeteners, stimulants, and orally consumed substances that induce weight L-carnitine, L-omithine, L-tyrosine, L-tryptophan, L-phenylalanine, gamma-linolenic acid, chromium, glucose tolerance factor, vanadyl sulfate, Gymnema sylvestere, bromelain, pancreatin, papain, curcumin, barberry, bearberry, Teucrium polium, choline, inositol, human growth hormone, DHEA (dehydroepiandosterone), caffeine, xanthines, kola nut, yerbamate, medium chain triglycerides, (–)-hydroxycitric Acid (HCA), kelp, lecithin, dihydroxyacetone, pyruvate, creatine, iodine, and bladderwrack, glutathione peroxidase, superoxide disumutase, lipotropics, phosphatidyl choline, methionine, tumeric, wall germander and Oregon grape root.

19. A nutritional supplement for oral administration to a mammal comprising:
    (a) a mixture of guar, oat, and psyllium, plus
    (b) at least one flavoring agent, and
    (c) a final composition containing at least 7 grams of fiber per serving, and
    (d) admixed with at least one potable liquid to create at least an 8 ounce beverage, and
    (e) an orally administered liquid means of delivering a minimum of 7 grams of fiber per serving that can be consumed in beverage form.

20. A method of improving the cardiovascular health of a mammal comprising:
    (a) orally administering a nutritional supplement containing at least 7 grams of fiber per serving comprising a mixture of guar, oat, and psyllium fibers plus at least one flavoring agent and admixed with at least one potable liquid to create a beverage that is ingested by a mammal at least one time daily, and
    (b) consumption of said supplement resulting in at least one health benefit by improving at least one condition associated with increased risk of cardiovascular disease selected from the group consisting of cardiac inflammation, metabolic syndrome, cardiovascular disease, cerebrovascular disease, peripheral vascular disease, overweight, obesity, fiber deficiency, poor nutrition, insulin resistance, glucose intolerance, diabetes, hypertension, sleep apnea, elevated dietary cholesterol consumption, elevated saturated fat consumption, elevated trans fatty acid consumption, elevated serum lipids, elevated serum lipoproteins, elevated serum total cholesterol, elevated serum LDL cholesterol, elevated triglycerides, elevated serum homocysteine, elevated serum high sensitivity C-reactive protein and reduced serum HDL cholesterol.

21. The method according to claim 20, in which at least one potable liquid is admixed to said nutritional supplement of claim 20 in sufficient quantity to create at least an 8 ounce beverage.

22. The method according to claim 20, further comprising:
    (a) admixing the composition of claim 20 to create a semisolid food product, which is consumed at least one time daily, and
    (b) said semisolid food product to be accompanied by consumption of sufficient quantity of at least one potable liquid to further hydrate the consumed fiber.

23. The method according to claim 20, further including admixing at least one edible fiber.

24. The method according to claim 20, further including admixing at least one ingredient selected from the group consisting of carbohydrates, fats, proteins, antioxidants, electrolytes, vitamins, minerals, enzymes, coenzymes, botanicals, herbs, anthocyanins, anthocyanidins, beta-carotene, bioflavonoids, catechins, carotenoids, curcuma, dandelion root, epicatechins, flavones, flavonoids, flavonols, teas, tea polyphenols, garlic, ginkgo biloba, grape seed, grape skin, green tea, epigallocatechin-3-O-gallate, indoles, isocyanates, isoflavones, isoflavonoids, isoprenoids, lycopene, organosulfur compounds, phenols, phenolic acids, polyphenolic compounds, pycnogenols, resveratrol, silymarin, terpenes, tannins, thiols, and tocopherols (beta, gamma, and delta), alpha-lipoic acid, coenzyme Q10, and n-acetyl-l-cysteine, organoleptic agents, thickening agents, thinning agents, emulsifiers, coloring agents, preservatives, flavoring agents, sweeteners, stimulants, thermogenics, lipogenesis inhibitors, L-carnitine, L-omithine, L-tyrosine, L-tryptophan, L-phenylalanine, gamma-linolenic acid, chromium, glucose tolerance factor, vanadyl sulfate, Gymnema sylvestere, bromelain, pancreatin, papain, curcumin, barberry, bearberry, Silymarin, Teucrium polium, choline, inositol, human growth hormone, DHEA (dehydroepiandosterone), caffeine, xanthines, kola nut, yerbamate, medium chain triglycerides, (–)-hydroxycitric Acid (HCA), kelp, lecithin, dihydroxyacetone, pyruvate, creatine, iodine, and bladderwrack glutathione peroxidase superoxide disumutase, liipotropics, phosphatidyl choline, methionine, tumeric, wall germander and Oregon grape root.

25. A method of improving the health of a mammal comprising:
    (a) orally administering a nutritional supplement containing at least 7 grams of fiber per serving comprising a mixture of guar, oat, and psyllium fibers plus at least one flavoring agent and admixed with at least one potable liquid to create a beverage to be ingested by to a mammal at least one time daily, and
    (b) consumption of said supplement resulting in at least one health benefit obtained through reducing absorption of harmful substances selected from the group consisting of toxins, heavy metals, and carcinogens by at least one absorption limiting mechanism selected from the group consisting of mechanisms that bind said harmful substances, mechanisms that detoxify said harmful substances, and mechanisms that speed said harmful substances out of the mammalian gastrointestinal tract.

26. The method according to claim 25, in which at least one potable liquid is admixed to said nutritional supplement of claim 25 in sufficient quantity to create at least an 8 ounce beverage.

27. The method according to claim 25, further comprising:
    (a) admixing the composition of claim 25 to create a semisolid food product, which is consumed at least one time daily, and
    (b) said semisolid food product to be accompanied by consumption of sufficient quantity of at least one potable liquid to further hydrate the consumed fiber.

28. The method according to claim 25, further including admixing at least one edible fiber.

29. The method according to claim 25, further including admixing at least one ingredient selected from the group consisting of carbohydrates, fats, proteins, antioxidants, electrolytes, vitamins, minerals, enzymes, coenzymes, botanicals, herbs, anthocyanins, anthocyanidins, beta-carotene, bioflavonoids, catechins, carotenoids, curcuma, dandelion root, epicatechins, flavones, flavonoids, flavonols, teas, tea polyphenols, garlic, ginkgo biloba, grape seed, grape skin, green tea, epigallocatechin-3-O-gallate, indoles, isocyanates, isoflavones, isoflavonoids, isoprenoids, lycopene, organosulfur compounds, phenols, phenolic acids, polyphenolic compounds, pycnogenols, resveratrol, silymarin, terpenes, tannins, thiols, and tocopherols (beta, gamma, and delta), alpha-lipoic acid, coenzyme Q10, and n-acetyl-l-cysteine, organoleptic agents, thickening agents, thinning agents, emulsifiers, coloring agents, preservatives, flavoring agents, sweeteners, stimulants, thermogenics, lipogenesis inhibitors, chromium, glucose tolerance factor, pancreatin, papain, curcumin, barberry, bearberry, choline, inositol, caffeine, xanthines, kola nut, yerbamate, medium chain triglycerides, kelp, lecithin, dihydroxyacetone, pyruvate, creatine iodine bladderwrack, glutathione peroxidase, superoxide disumutase, lipotropics, phosphatidyl choline, methionine, tumeric, wall germander and Oregon grape root.

* * * * *